Oct. 12, 1926.  1,602,988
L. N. MILLER
DEHYDRATION PLANT
Filed Nov. 18, 1925  2 Sheets-Sheet 1
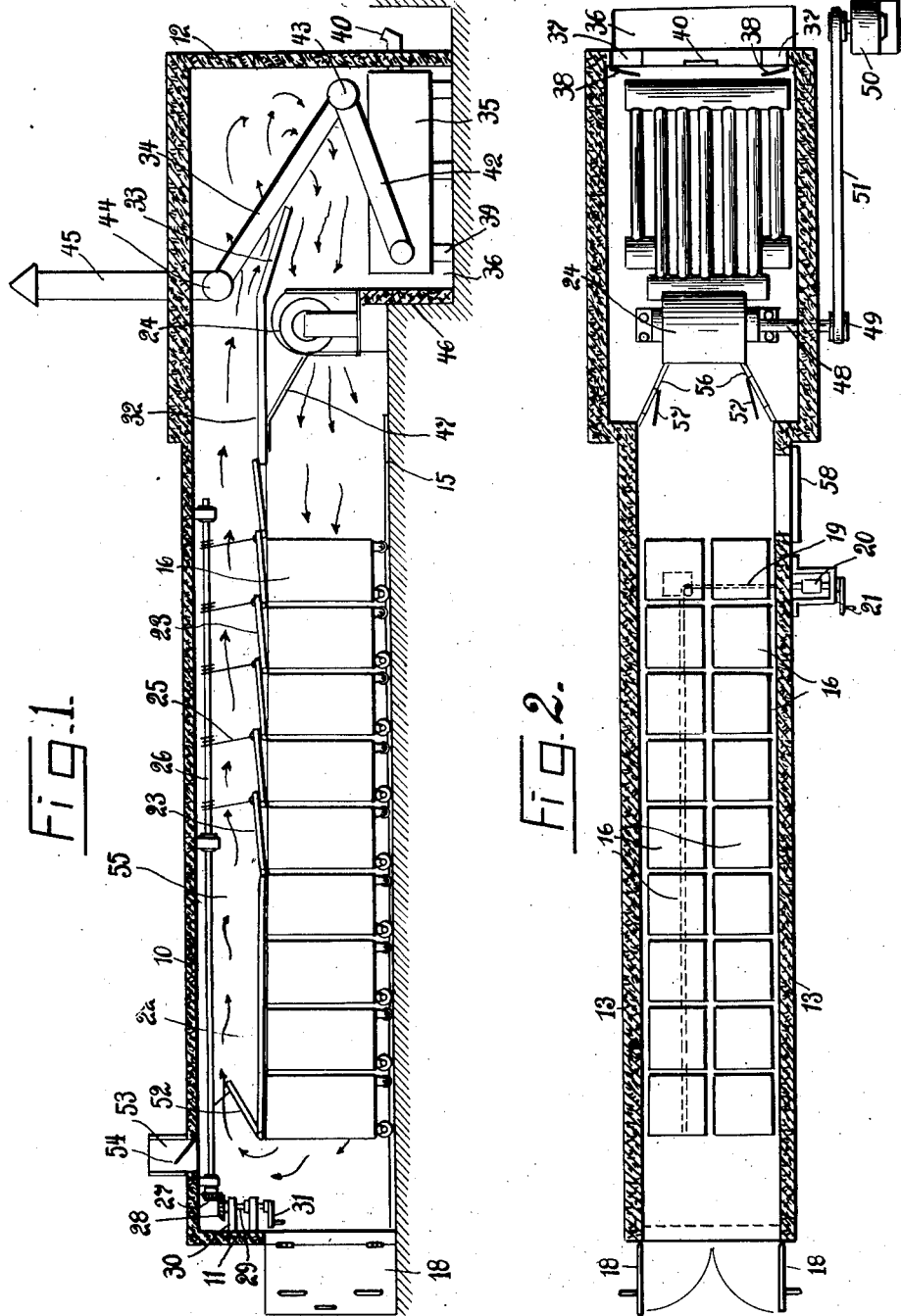
INVENTOR
Lauritz N. Miller
BY Hastings N. Baker
ATTORNEY

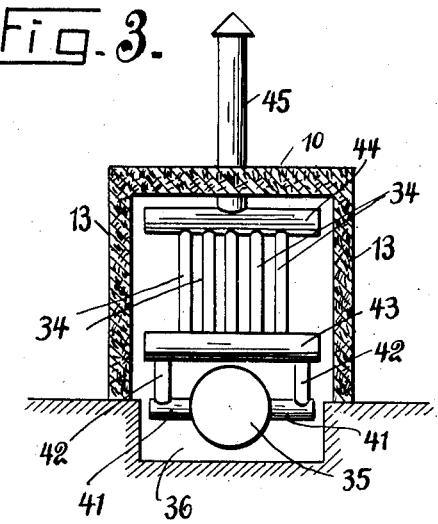
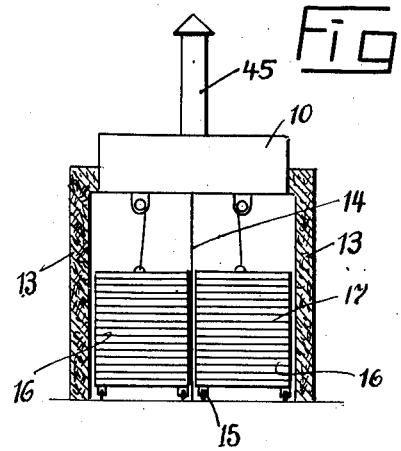
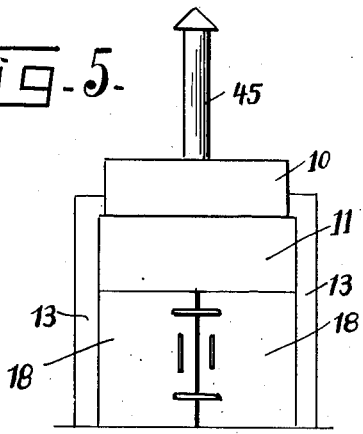
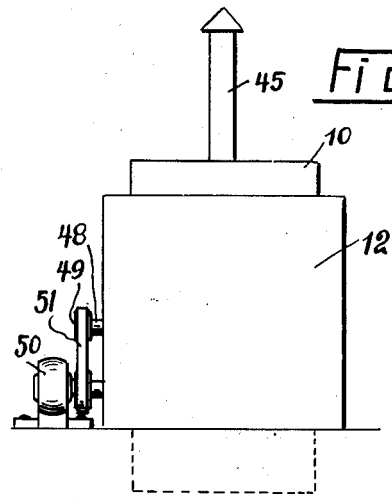

Patented Oct. 12, 1926.

1,602,988

UNITED STATES PATENT OFFICE.

LAURITZ N. MILLER, OF EUGENE, OREGON.

DEHYDRATION PLANT.

Application filed November 18, 1925. Serial No. 69,754.

This invention relates to an improved dehydrating plant in which fruit and the like is placed to be dried or to have the water content removed therefrom.

One of the objects of the invention is to provide a fan in front of the dried fruit and which fan blows heated air directly on the fruit, thereby eliminating any cold pockets.

Another object of the invention is to provide a fan directly back of the hot end of the heating means, or the stove, which fan takes up the heated air and thoroughly mixes it so that the entire volume of air passing from the fan is at an even temperature, which heated air is then passed into and through a tunnel in which the fruit is placed.

Another object of the invention is to provide a structure in which the stove or furnace is located at one end of the system, the fuel intake end being toward the outer wall and the radiating or flue end extending toward the fan. Thus when operated, the heated air is drawn from the stove and into the fan, being continually replaced by cooler air passing over and cooling the stove.

Another object of the invention is to eliminate the danger incident to the fan stopping for any reason when a full heat is on. By the construction described in this application no damage would be done to the fruit in the tunnel as the heated chamber is separate from the tunnel in which the fruit is placed. In case the fan were stopped the direction of travel of the heated air would be reversed and the heated air would pass along the return shaft and out into the exhaust.

It is possible to install and operate a fan of ample capacity to insure a maximum output when fruit conditions are favorable and when adverse conditions arise a control of the air flow is possible which would control the temperature throughout the entire length of the drying tunnel. This object is accomplished by opening shutters in the roof of the drying tunnel, or by opening shutters in the side walls close to the fan, and allowing a part of the air to re-circulate through the fan without passing through the tunnel, thereby decreasing the velocity of the air flow in the rear end of the tunnel, and increasing the flow of the hot end thereof to a greater velocity as part of the air would have a shorter distance to travel.

By this means the static of the air is lightened or decreased so that delivery of the fan is increased, so that while the cool end is slowed up the hot end is hurried enough to offset it. Thus it is possible to return part or all of the air without the air passing through the fruit or other matter to be dried, thereby regulating the velocity to the desired flow. This is especially important in case the tunnel is only partially filled with material to be dehydrated.

The heating apparatus is so constructed that the return air strikes the heating pipes at the coldest point and then travels down along the heating pipes, reaching the intense heat of the stove, from which it is drawn into the fan. This arrangement conserves fuel, making it possible to heat the air with the minimum amount of radiation surface.

The fresh air intake and the fan being located at one end of the system and the exhaust at the extreme opposite end thereof, a sensitive humidity control is provided. Thus the opening of a door on a side of the tunnel to remove the dried fruit does not cause much loss of heat as the system is effected by the intake, and by closing the intake when opening the side door, no appreciable loss of heat or moisture occurs.

Other objects will appear in the detailed specification which follows.

In the drawings:

Figure 1 is a sectional view showing the interior of the dehydrating plant.

Figure 2 is a plan view thereof.

Figure 3 is a front sectional view.

Figure 4 is a rear sectional view, showing the cars in the tunnels.

Figure 5 is a rear elevational view, and

Figure 6 is a front elevational view.

Referring to the drawings in more detail, the dehydrating plant is constructed of any suitable material such as brick, and consists of a roof, 10, a rear wall 11, a front wall 12, and side walls 13. If a two-tunnel plant is to be used, the tunnels are separated by means of a partition wall, 14.

Each of the tunnels is provided with a track-way 15, on which the cars 16 roll. The trays 17, first filled with the plums or other fruits to be dehydrated, are placed upon the cars. The cars are then pushed through the doors 18 in the rear wall 11 and roll upon the trackway 15. Any suitable means may be provided to pull the cars forward, such as a rope 19 attached to a windlass 20 which may be operated by a hand crank 21.

A horizontal wall 22 extends from a short distance forward of the wall 11 for the distance of about four car lengths, which wall 22 is supported by a convenient means, such as the side walls 13. Doors 23 extend forwardly from the wall 22 to a point shortly to the rear of the fan 24. The doors 23 may be raised by any suitable means, such as by ropes 25 each of which is secured at its one end to the swinging end of the door and at its other end to a rotatable means such as the shaft 26 operated by means of a beveled pinion 27 on the shaft 26, which pinion meshes with a beveled pinion 28 on a shaft 29 supported in bearings 30 carried by the rear wall 11, which shaft may be manually rotated by means of a crank 31. I desire for it to be distinctly understood that the means herein shown for operating the doors 23 is by way of illustration only, and any suitable means for accomplishing the desired purpose of raising or lowering the doors may be employed.

A wall 32 extends forwardly from the foremost door 23 and just over the fan 24 is met by a baffle plate 33, which baffle plate extends entirely across the width of the plant and extends forwardly to a point approximately midway of the length of the flue 34.

I have found it best to place the furnace or heater 35 in the pit 36. The front wall 12 has openings 37 in the pit which openings may be closed by doors 38. The furnace 35 is supported by standards or legs 39 which hold the furnace 35 above the floor of the pit. A burner 40 for gas or any other heating means is provided in the furnace. Extending outwardly from each side of the furnace are flues 41 which flues communicate with two forwardly and upwardly extending flues 42, which flues 42 communicate with a drum 43 extending horizontally and parallel to the front wall. The drum 43 communicates with a plurality of flues 34 extending upwardly and rearwardly over the baffle plate, and communicates with a drum 44, which drum communicates with an outlet flue 45.

A wall 46 is provided at the rear of the pit, which wall supports the fan 24 in whole or in part. A wall 47 extends from the rear end of the fan upwardly and rearwardly to the wall 32. The fan 24 is operated by means of a shaft 48 extending through one of the side walls 13 which shaft carries a pulley 49 driven from the motor 50 by means of a belt 51.

A door 52 is provided at the rear end of the wall 22, which door can be raised or lowered by any means, such as by means of one of the ropes 25. An exit air hole 53 is provided at the rear of the plant, which air hole may be opened or closed by means of a door 54.

As above mentioned, the fruit is placed in trays in the cars and the cars are then pushed into the tunnel through the doors 18. Naturally, this is the cold end of the tunnel, for it is furthest removed from the heat. This is essential for if the fruit is at first subjected to too much heat, the outer part of the fruit dries before the inner part dries, with the result that the outer part thereof cracks and hardens so that the inner part cannot be dehydrated satisfactorily. In the arrangement here shown the fruit is therefore at first subjected to the minimum heat and as it is advanced toward the front end of the plant will be subjected to a greater heat if desired, or it may be maintained at practically the same temperature. Upon commencing the operation of the plant the heater is of course fired and the fan should be started after the heater has reached a proper temperature. If the doors 38 are closed the humidity will rapidly rise on account of the moisture given out by the drying fruit. This humidity may be readily controlled by opening the doors 54 and 38 so that fresh air having a low moisture content will be admitted while the humid air passes out through the hole 53 in the rear of the plant. The humidity can therefore be readily controlled at all times.

Furthermore, the heat can be readily controlled, for if it is desired to give the fruit in the rear of the plant a small amount of heat while subjecting the fruit in the front of the plant to considerable heat, one or more or all of the doors 23 may be raised, so that only a portion of the heated air will be forced from the front of the plant, through the fan, and through the fruit in the rear of the plant. Any amount of this air may be caused to pass upwardly through the doors 23 without passing through the fruit in the rear of the plant. Since one door is provided forwardly of all of the cars, this door may be raised so as to decrease the amount of air passing through all of the cars and hence lowering the temperature. If the heated air is forced through all of the cars, it passes upwardly over the rear of the wall 22 and through the return tunnel 55. If any one or more of the doors 23 are opened part of the air passes upwardly through these doors into the return tunnel 55, while the remainder passes through all of the cars and through the return tunnel 55. As the air passes forwardly through the return tunnel 55, it passes over the baffle plate 33, striking the drum 44, and traveling forwardly and downwardly between the flues 34, over and around the drum 43, and over the furnace 35. While it has been traveling downwardly and over the furnace it has been heated. This heated air is now drawn into and through the fan 24. The wall 47 and corresponding side walls 56, extending from the fan to the side walls 13, prevent the air passing from above the furnace into the tunnel for the cars without passing through the fan. However, the walls 56 are provided with doors 57, which doors may be opened in case it is desired to decrease the velocity of the air so as to better regulate the temperature, for as the velocity of the air is decreased, the temperature would be correspondingly diminished.

When the fruit has been dehydrated to the desired extent it is removed from the plant through a door 58, normally closed, and located in the side wall 13. The cars may be readily made to pass through this opening because the front wheels of the cars are carried by an enlarged castor, so that the car may be readily swung around so as to pass through the door. If this door is open when the doors 38 are open, the air pressure is in equilibrium and therefore very little air would pass out through the door 58. It is therefore apparent that the fruit can be removed without materially decreasing the efficiency of the plant, even when it is in full operation.

It is therefore apparent that by my improved construction the temperature in every part of the plant may be regulated to suit the varying requirements of fruit in any or all conditions, that a part may be heated more than the other at the will of the operator and that in case the fan should be stopped for any reason such as a breakdown, the heated air would cease to flow through the fruit but would pass upwardly over the baffle plate 33, through the return channel 55, and out of the door 54. A breakdown would therefore not destroy the fruit, although it would delay the dehydration thereof.

In case the humidity became too great or more than was desirable, the humidity can be regulated at will by means of doors 38 and 54, and can be further regulated by means of the door 52, for it is obvious that all of the air in the entire plant would be changed by opening the doors 38 and 54, and closing the door 52.

It is obvious that many changes might be made in the construction of the plant without departing from the spirit of this invention. The specific construction shown has been presented as a means of illustration or embodiment of the invention, but I reserve the right to make all the changes in construction which may be fairly within the scope of the appended claims.

Having now described my invention, I claim:

1. In a dehydrating plant, the combination of a heating compartment, a dehydrating tunnel, a partition between said compartment and tunnel, and a fan in said partition whereby the air from the heating compartment is forced into said tunnel.

2. In a dehydrating plant, the combination of a heating compartment, a dehydrating tunnel, a return conduit communicating with said tunnel and heating compartment, a partition between said compartment and tunnel, and a fan placed adjacent to an opening in said partition whereby the air from the heating compartment is forced into said tunnel and from said tunnel through said conduit into said heating compartment.

3. In a dehydrating plant, the combination of a heating compartment, a dehydrating tunnel, a return conduit communicating with said tunnel and heating compartment, a partition between said compartment and tunnel, a fan placed adjacent to an opening in said partition whereby a circulation of air is maintained in said heating compartment, tunnel and conduit, and means whereby the velocity of the air in any part of the tunnel may be varied.

4. In a dehydrating plant, the combination of a heating compartment, a dehydrating tunnel, a return conduit communicating with said tunnel and heating compartment, a partition between said compartment and tunnel, a fan placed adjacent to an opening in said partition whereby a circulation of air is maintained in said heating compartment, tunnel and conduit, and means between said tunnel and conduit whereby the velocity of the air in any part of the tunnel may be varied.

5. In a dehydrating plant, the combination of a heating compartment, a dehydrating tunnel, a return conduit communicating with said tunnel and heating compartment, a partition between said compartment and tunnel, a fan placed adjacent to an opening in said partition whereby a circulation of air is maintained in said heating compartment, tunnel and conduit, and means whereby the humidity may be regulated.

6. In a dehydrating plant, the combination of a heating compartment, a dehydrating tunnel, a return conduit communicating with said tunnel and heating compartment, a partition between said compartment and tunnel, a fan placed adjacent to an opening in said partition whereby a circulation of air is maintained in said heating compartment, tunnel and conduit, and means whereby a part of the air in said tunnel is returned to said conduit before it has traversed the length of the tunnel.

7. In a dehydrating plant, the combination of a heating compartment, a dehydrating tunnel, a return conduit communicating with said tunnel and heating compartment, a partition between said compartment and tunnel, a fan placed adjacent to an opening in said partition whereby a circulation of air is maintained in said heating compartment, tunnel and conduit, and trap doors separating said tunnel and conduit whereby a part of the air in said tunnel is permitted to return to said conduit when the trap doors are open before the air has traversed the length of the tunnel.

8. In a dehydrating plant, the combination of a heating compartment, a dehydrating tunnel, a return conduit communicating with said tunnel and heating compartment, a partition between said compartment and tunnel, a fan placed adjacent to an opening in said partition whereby a circulation of air is maintained in said heating compartment, tunnel and conduit, trap doors separating said tunnel and conduit whereby a part of the air in said tunnel is permitted to return to said conduit when the trap doors are open before the air has traversed the length of the tunnel, and means whereby said trap doors may be controlled.

9. In a dehydrating plant, the combination of a heating compartment, a dehydrating tunnel, a return conduit communicating with said tunnel and heating compartment, a partition between said compartment and tunnel, a fan placed adjacent to an opening in said partition whereby the air from the heating compartment is forced into said tunnel, an exit door near the communicating ends of said tunnel and conduit, and means whereby all or any part of the air passing from said tunnel may be directed through said exit door.

10. In a dehydrating plant, the combination of a heating compartment, a dehydrating tunnel, a return conduit communicating with said tunnel and heating compartment, a partition between said heating compartment and tunnel, an exit door near the communicating ends of said tunnel and conduit, and means whereby all or any part of the air may be forced from said tunnel through said exit door.

11. In a dehydrating plant, the combination of a heating compartment, a dehydrating tunnel, a return conduit communicating with said tunnel and heating compartment, a partition between said heating compartment and tunnel, an exit door near the communicating ends of said tunnel and conduit, and means whereby all or any part of the air may be forced from said tunnel through said exit door, said means including a door at the entrance to the conduit.

12. In a dehydrating plant, the combination of a heating compartment, a dehydrating tunnel, a return conduit communicating with said tunnel and heating compartment, a partition between said compartment and tunnel, a fan placed adjacent to an opening in said partition whereby the air from the heating compartment is forced into said tunnel, and means whereby the air returning from the conduit to the heating compartment is progressively brought into contact with higher temperatures.

13. In a dehydrating plant, the combination of a heating compartment, a dehydrating tunnel, a return conduit communicating with said tunnel and heating compartment, a partition between said compartment and tunnel, a fan placed adjacent to an opening in said partition whereby the air from the heating compartment is forced into said tunnel, a furnace in said heating compartment, and flues extending from said furnace through said heating compartment and through a portion of said conduit.

14. In a dehydrating plant, the combination of a heating compartment, a dehydrating tunnel, a return conduit communicating with said tunnel and heating compartment, a partition between said compartment and tunnel, a fan placed adjacent to an opening in said partition whereby the air from the heating compartment is forced into said tunnel, a furnace in said heating compartment, and flues extending from said furnace through said heating compartment and through a portion of said conduit, the flues being so arranged that the air returning from the conduit first strikes the part of the flues furthest removed from the furnace and then travels in close proximity to said flues whereby the air absorbs the heat from the flues before it comes into contact with the furnace.

15. In a dehydrating plant, the combination of a heating compartment, a dehydrating tunnel, a return conduit communicating with said tunnel and heating compartment, a partition between said compartment and tunnel, a fan placed adjacent to an opening in said partition whereby the air from the heating compartment is forced into said tunnel, a furnace in said heating compartment, and doors leading into said compartment near the lower part of said furnace so that the air coming through said doors will pass around said furnace absorbing the heat therefrom.

16. In a dehydrating plant, the combination of a heating compartment, a dehydrating tunnel, a return conduit communicating with said tunnel and heating compartment, a partition between said compartment and tunnel, a fan placed adjacent to an opening in said partition whereby the air from the heating compartment is forced into said tunnel, and a furnace in the said compartment, the fan being located directly back of the hot end of the furnace so that the fan will take up the heated air and thoroughly mix it so that the air passing into the tunnel will be at an even temperature and the heat of the furnace will be absorbed thereby cooling the furnace.

17. In a dehydrating plant, the combination of a heating compartment, a dehydrating tunnel, a return conduit communicating with said tunnel and heating compartment, a fan whereby the air from the heating compartment is forced into said tunnel, and means whereby the heat from the heating compartment will be directed away from the tunnel in case the fan stops.

In testimony whereof I affix my signature.

LAURITZ N. MILLER.